United States Patent [19]

Reinicke et al.

[11] Patent Number: 5,501,425
[45] Date of Patent: Mar. 26, 1996

[54] MAGNETOSTRICTIVELY ACTUATED VALVE

[75] Inventors: Robert H. Reinicke, Mission Viejo, Calif.; Derek T. Schappell, Morristown, N.J.

[73] Assignee: Marotta Scientific Controls, Inc., Montville, N.J.

[21] Appl. No.: 309,776

[22] Filed: Sep. 21, 1994

[51] Int. Cl.[6] .................................................. F16K 31/06
[52] U.S. Cl. ................................ 251/129.15; 251/129.01
[58] Field of Search ........................ 251/129.01, 129.15, 251/129.16, 65; 335/279, 281, 274, 215

[56] References Cited

U.S. PATENT DOCUMENTS

| | | | |
|---|---|---|---|
| 3,814,376 | 6/1974 | Reinicke | 251/65 |
| 4,553,735 | 11/1985 | Brundage | 335/297 X |
| 4,756,331 | 7/1988 | Stegmaier | 251/129.15 X |
| 4,890,815 | 1/1990 | Hascher-Reichl et al. | 251/129.15 |
| 5,218,999 | 6/1993 | Tanimoto | 251/129.15 X |
| 5,375,811 | 12/1994 | Reinicke | 251/129.16 |

Primary Examiner—Martin P. Schwadron
Assistant Examiner—Kevin L. Lee
Attorney, Agent, or Firm—Hopgood, Calimafde, Kalil & Judlowe

[57] ABSTRACT

A valve for fail-safe return to its normally closed condition relies upon solenoid-driven elongation of a magnetostrictive core element, for opening displacement of a valve member, and also relies upon a continuously available, stiffly compliant preload of the valve member into its position of lock-up at valve closure. The currently preferred material of the core is Terfenol-D, which offers a strong elongation response to inductively coupled excitation. The elongation response is sufficient to serve the purposes of driving a poppet-valve member from closed to open position, with a relatively short time constant, as well as to permit a closed condition of the valve wherein the driving end of the core is effectively disconnected from the poppet-valve member, so that the prestressed stiff compliance can alone be operative on the poppet-valve member for fail-safe closure of the valve.

34 Claims, 3 Drawing Sheets

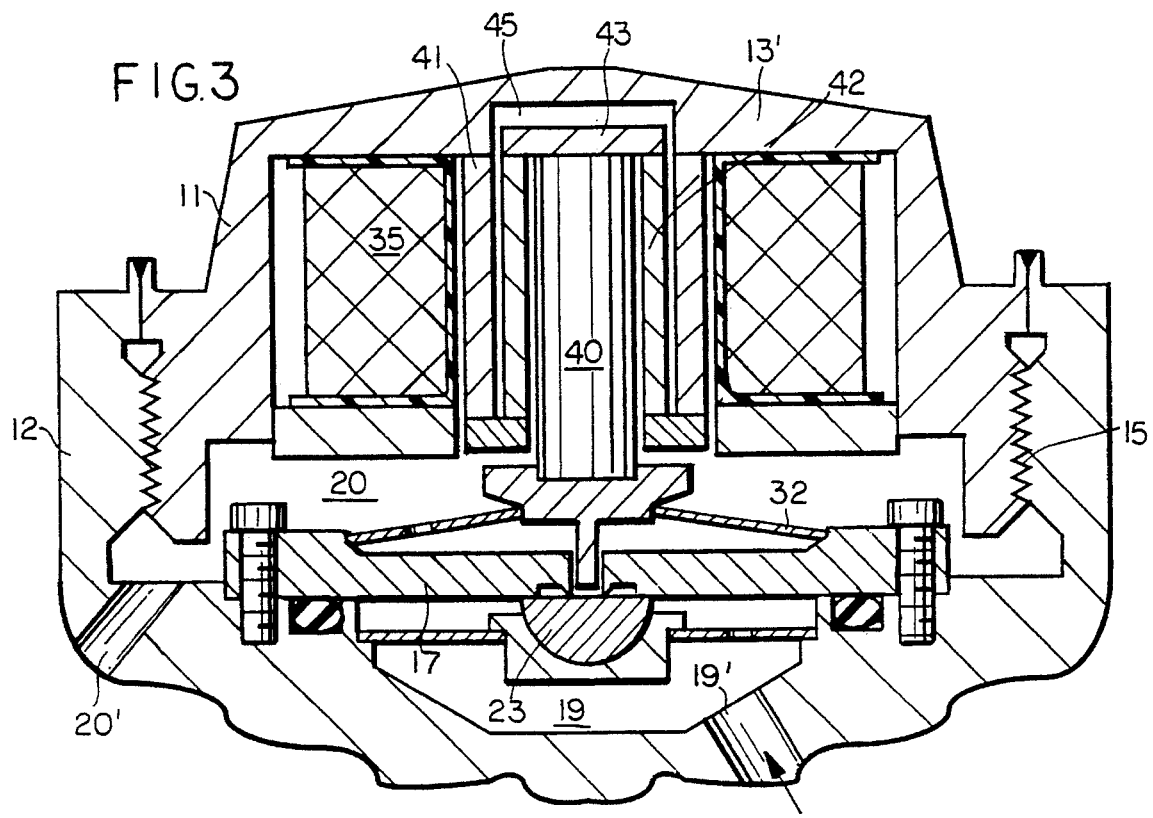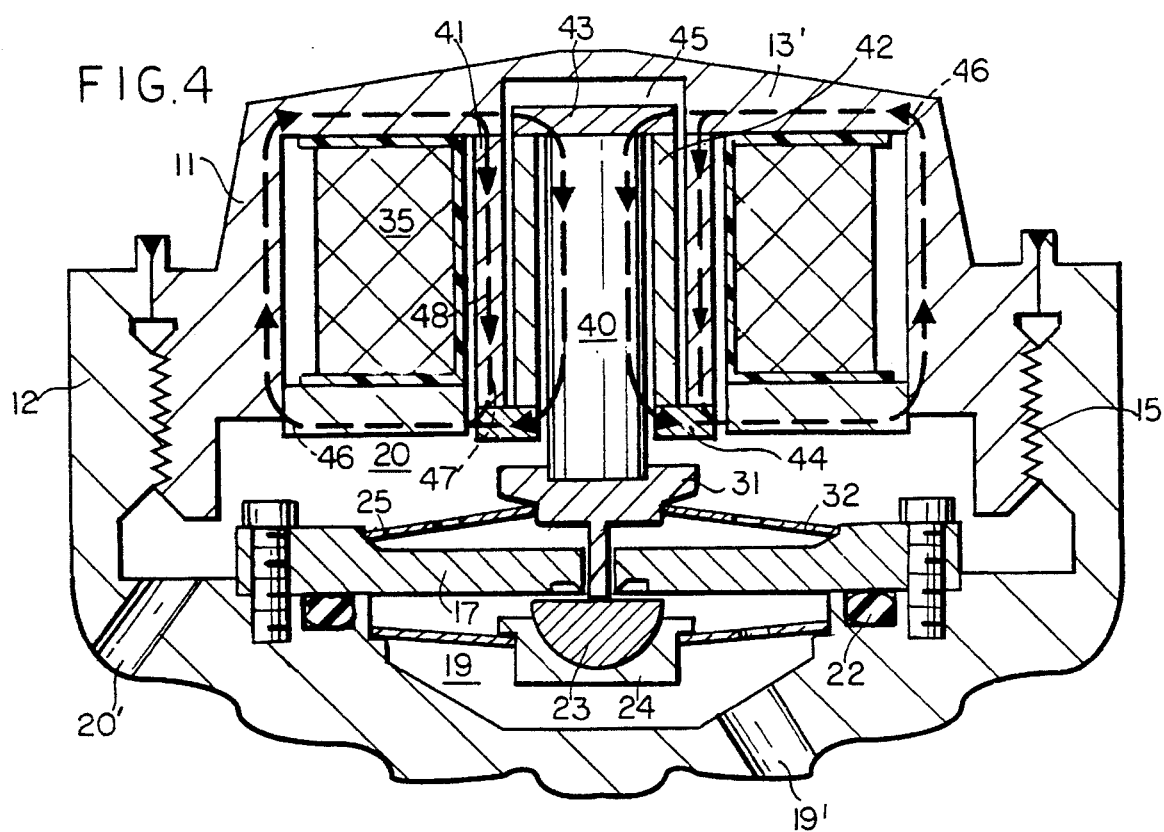

MAGNETOSTRICTIVELY ACTUATED VALVE

BACKGROUND OF THE INVENTION

The invention relates to a valve construction wherein solenoid excitation of an elongate magnetostrictive core element is relied upon to actuate a valve for control of a fluid flow, as for controlling the flow of a pressure fluid from an upstream source to an outlet for downstream storage or utilization at reduced pressure. The invention has illustrative application as a regulating valve, wherein the upstream supply pressure is, at least initially, in the order of 2000 psia, and wherein a relatively small-volume tank (e.g., a 6-inch length of tubing of 0.22 inch ID) is to be loaded with ramped increasing pressure to a set point of outlet pressure in the order of 27 psia, the valve being automatically modulated as needed to maintain tank ullage pressure in an operating band of ±1.5 psi, during step on-off demands for operating fluid from the tank.

For the kind of spacecraft application which favors the invention, the valve is necessarily of normally closed variety and a very high seating force is desired to provide positive sealing and very low leakage under lock-up (i.e., valve-closed) conditions. Pressurized propellant gas for maneuvering must be conserved at all costs, relying upon valves with superior (i.e., very low) leakage resistance under lock-up conditions, yet offering fast response to instant demand. Thus, shut-off, isolation, low friction, mechanical simplicity and small size are important considerations in a valve of the character indicated. A magnetically latching and magnetically actuated valve of the nature described in U.S. Pat. No. 3,814,376 or in pending application Ser. No. 08/184,484 has properties approaching the desired low-leakage of a valve-closed condition, but the time constant for valve actuation (opening or closing) is greater than would be desired, and the seating force is less than desired.

BRIEF STATEMENT OF THE INVENTION

It is an object to provide an improved valve construction of the character indicated.

A specific object is to provide a valve construction having superior lock-up properties of sealing against leakage of pressure fluid for the valve-closed condition.

Another specific object is to meet the above objects with a basically simple miniaturizable configuration, having application for control of propellant gas stored under high pressure for use in maneuvered orientation of a spacecraft.

A further specific object is to meet the above objects with a construction having a fast time constant of valve opening and closing, and exhibiting inherently little mechanical hysteresis, under a wide range of ambient temperature conditions and offering a fail safe condition of superior valve lock-up against leakage of pressure fluid.

The invention achieves these objects in a valve construction which relies upon solenoid-driven elongation of a magnetostrictive core element, for opening displacement of a valve member, and which also relies upon a continuously available, stiffly compliant preload of the valve member into its position of lock-up at valve closure. The currently preferred material of the core is Terfenol-D, which offers a strong elongation response to inductively coupled excitation. The elongation response is sufficient to serve the purposes of driving a poppet-valve member from closed to open position, with a relatively short time constant, as well as to permit a closed condition of the valve wherein the driving end of the core is effectively disconnected from the poppet-valve member, so that a strongly prestressed compliant member can alone be operative on the poppet-valve member for fail-safe closure of the valve.

In the present description, for convenience of reference, the central axis of the valve system will be sometimes referred to as "upstanding" or "vertical", thus justifying use of the words "upper" and "lower" in connection with various component parts. But it is to be understood that a "vertical" orientation is not necessary for operation of the invention, in that valve operation is not in any sense dependent upon any relation to the instantaneous gravity vector.

BRIEF DESCRIPTION OF THE DRAWINGS

Several preferred and illustrative embodiments of the invention will be described in detail, in conjunction with the accompanying drawings, in which:

FIG. 3 is a view similar to FIG. 1, for a second embodiment, shown for the closed position of the valve;

FIG. 4 is a view similar to FIG. 3, for an actuated condition of the valve, with schematic indication of electromagnetically induced excitation flux;

DETAILED DESCRIPTION

Figure 1:
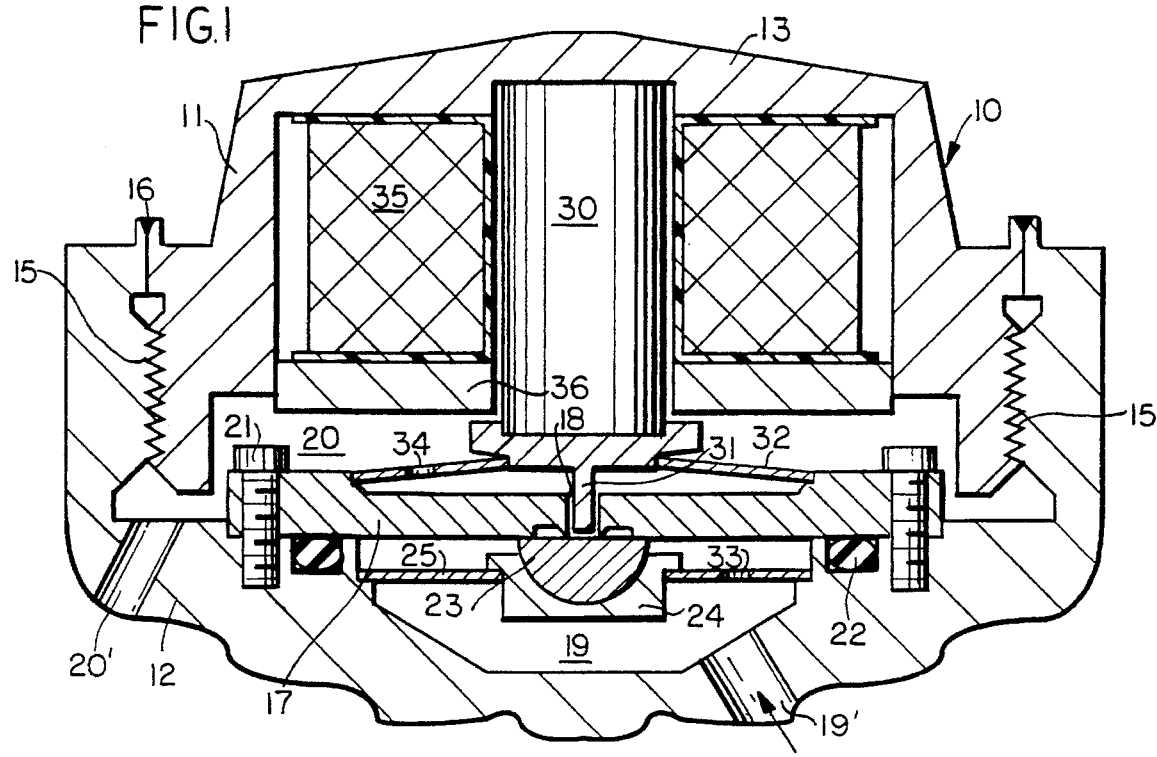
FIG. 1 is a view in longitudinal section of a first valve embodiment of the invention, shown for the closed position of the valve.
Figure 2:
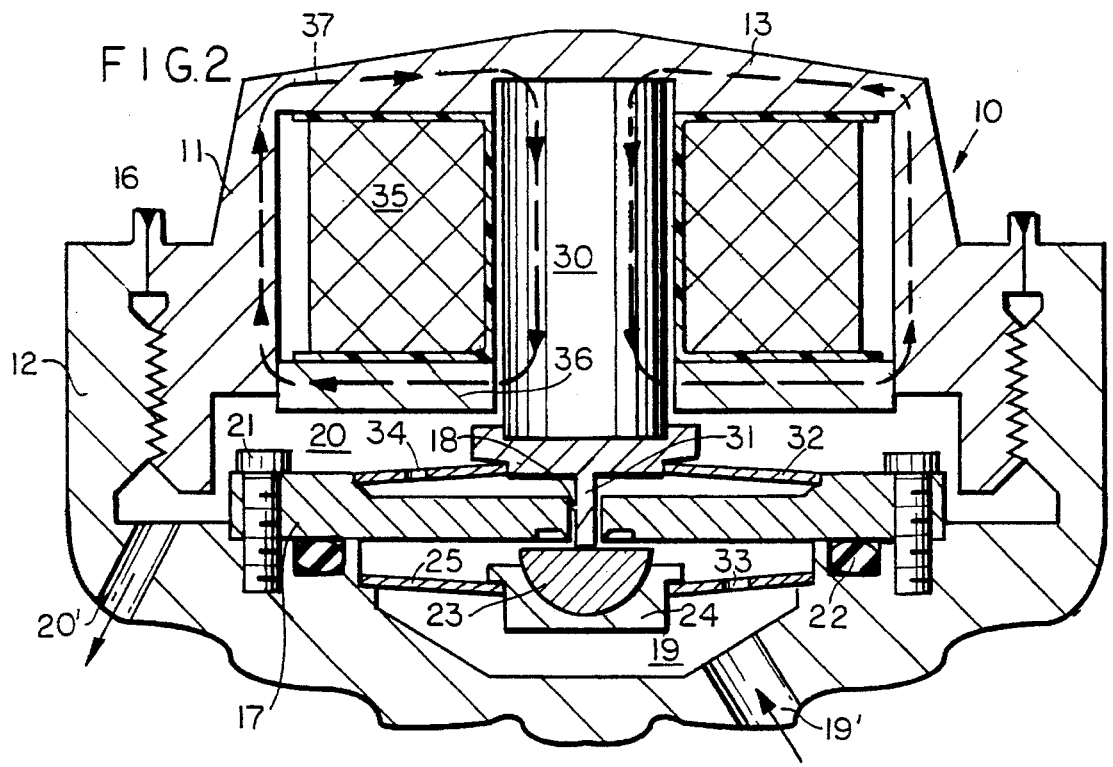
FIG. 2 is a view as in FIG. 1 for an actuated condition of the valve, with schematic indication of the flow of electromagnetically induced excitation flux.

Referring initially to the embodiment of FIGS. 1 and 2, the invention is shown to comprise a body 10 consisting of an upper cup-shaped part 11 and a lower cup-shaped part 12, concentric with a central axis A, so as to define an internal cavity volume between their respective end-closure walls 13, 14. The respective skirt portions of parts 11, 12 are in telescopically fitted overlap and are engaged by screwthreads 15, which as fine or short-pitch threads, and a circumferential weld 16 is indicated for permanently sealed retention of the engagement, once it meets a required thread-adjustment purpose to be later explained.

A circular seat member or plate 17 has a central opening 18 about axis A and is shown located by a short counterbore in the closed end 14 of lower body part 12, thus dividing the internal cavity into an inlet chamber or manifold 19 and an outlet chamber or manifold 20, the inlet chamber 19 being served by an inlet port 19' and the outlet chamber 20 having an outlet port 20'. Mounting bolts 21 secure seat member 17 to lower body part 12, and an elastomeric seal ring 22 assures that pressure-fluid flow from the inlet port 19' to the outlet port 20' shall be only to the extent that a poppet-valve member 23 is not fully sealed in its annular area of closure against the flat underside of seat member 17. The poppet-valve member 23 and seat member 17 are preferably of a hard material such as silicon carbide, and their flat-to-flat engagement for the closed condition preferably involves lap-ground surfaces.

The poppet-valve member 23 is shown with a spherical surface for self-aligning support in a flanged boss 24, and its flat seating surface may be in a diametral plane of the spherical surface. A first compliant means or poppet spring 25, prestressed to load boss 24 and valve member 23 to the normally closed position of FIG. 1, is shown as a Belleville washer having an inner circular edge engaged against the flange of boss 24 and an outer circular edge that locates in another counterbore in the end-closure wall 14 of lower body part 12.

An elongate rod or core 30 of magnetostrictive material within the outlet chamber is located at its upper end in a shallow bore in the end-closure wall 13 of upper body part 11, in concentric relation to axis A. At its lower end, rod 30 mounts or locates in a shallow bore of the flanged upper end of a poppet pin 31 which extends with radial clearance into the bore of seat opening 18, to a point which in the valve-closed condition of FIG. 1 is at short axially offset clearance with respect to poppet-valve member 23; the flanged poppet pin 31 may also be of hard material such as silicon carbide. A second and stiffly compliant means 32 in the form of another Belleville spring has its inner circular edge locating against a shoulder of the flanged poppet pin 31 and an outer circular edge located in a counterbore formation of the upper surface of seat member 17, and the prestressing of compliant means 32 is of such strength as to assure a strong preload of core element 30 (via the flange of poppet pin 31) into permanently secure assembly to the upper body part 11.

It should be explained that pressure fluid must be able to flow (when called for) from one to the other side of each of the respective Belleville springs; those skilled in the art will recognize that this function may be provided by one or more passages bridging the respective Belleville springs and that, alternatively, a few equally spaced apertures in the Belleville springs can also serve this function, as suggested by apertures 33, 34 in the respective springs 25, 32.

At the upper end of the cavity which has thus far been loosely referred to as the outlet chamber, the diameter of the magnetostrictive rod 30 establishes, with the cylindrical inner wall surface of the skirt of upper body part 11, an annular space which accommodates a solenoid or excitation winding 35 which, when excited, is inductively coupled to the core, namely, to rod 30. More specifically, winding 35 is suitably a coil of predetermined electrical capacity, wound upon a bobbin or carrier of non-magnetic material such as plastic-consolidated fiber or cardboard, and having an elongate central bore which establishes radial clearance with the core rod 30. An annular closure plate 36 seats and is retained via a counterbore in body part 11, and the inner cylindrical bore of plate 36 has radial clearance and axial overlap with rod 30 at the lower end region of rod 30, as shown.

The material of the upper body part 11, and of closure plate 36 mounted therein, is ferromagnetic, such as a magnetic-quality stainless steel, thus establishing with core rod 30 a toroidal path 37 of magnetic-flux flow, subject to electrical excitation of the winding 35, which is the situation depicted in FIG. 2. The lower body part 12 is not relied upon for any path of magnetic flux, but its material is preferably of stainless steel, without the requirement for magnetic quality. The magnetostrictive material of core rod 30 is preferably although not necessarily Terfenol-D, a specially formulated alloy of terbium, dysprosium and iron, and it is commercially available from Etrema Products, Inc., of Ames, Iowa.

For the indicated application of valves of presently described nature, flow rates for pressure fluids are low and therefore required axial displacements in response to magnetostrictive-core excitation are relatively small, e.g., flow rates of 0 to 12 mg/sec for the case of Xenon as the pressure fluid. The axial magnetostrictive stroke to achieve a maximum-flow of this magnitude is 0.00011 inch, for the case of a seat opening 18 of 0.040-inch diameter and a poppet-pin diameter of 0.020-inch diameter. This is readily achieved for a coil winding 35 of 4,000 turns of 29.5 AWG enamel-coated copper wire, and a maximum excitation current of 513 ma at 28 volts. The differential thermal coefficients of expansion for core rod 30 and the ferromagnetic material of flux-path elements 11, 36, for the great range of ambient temperature exposure expected of a spacecraft device (such as the prospective application alluded above) is such that a pre-travel of magnetostrictive growth of rod 30 must be allowed in order to assure positive and effective valve closure, as long as winding 35 is not energized. The axial clearance noted in connection with FIG. 1, between poppet-valve member 23 and the prospective abutment end of poppet pin 31 is in the order of 0.0005 inch, with conservative allowance for the difference between temperature coefficients of expansion, for body parts 11, 12 and for the core rod 30. As a practical matter, such clearance is readily established during initial assembly of the described valve, using slow threaded advance of the overlapped skirts of the cup-shaped body parts; the threaded advance is continued while monitoring poppet-valve member 23 for seated closure, i.e., until first detected onset of pressure-fluid leakage to outlet 20' (meaning that the advance of poppet pin 31 has been enough to contact the poppet-valve member). With knowledge of the thread (15) advance per turn, one can accurately back off (i.e., unthread) the engagement to a precisely predetermined extent, to achieve an axial clearance of the poppet pin from the valve member, in the suitable pre-travel amount of 0.0005 inch. For a magnetostrictive core rod 30 of Terfenol-D, 2.0 inches long, a maximum magnetostrictive stroke in the order of 0.002 inch is more than enough to account for the lost motion of pretravel displacement as well as an ensuing displacement for effecting the indicated maximum of poppet valve-member displacement. The poppet-bias load provided by spring 25 is suitably at least 20 lb., and the stronger bias supplied by spring 32 is suitably in the order of 40 lbs.

The valve embodiment of FIGS. 3 and 4 differs from that of FIGS. 1 and 2, essentially in the fact that FIGS. 3 and 4 show that the single excitation winding 35 can be utilized to actuate magnetostrictive-core means in a multiple-stage configuration, involving plural separately induced toroidal flux paths in parallel, wherein plural magnetostrictive core elements are in mechanically connected series array, thus establishing a net core elongation which is a multiple of the elongation of a single element.

More specifically, the embodiment of FIGS. 3 and 4 illustrates use of multiple-stage magnetostrictive core means wherein the plurality of stages is two, namely, a first or inner stage utilizing a central elongate magneto-strictive-rod element 40, and a second or outer stage utilizing an elongate annular magnetostrictive element 41. The elements 40, 41 are radially spaced from each other and are concentrically related to the same central upstanding axis A of the valve. A suitably formed elongate annular connecting member 42 of non-magnetic material (e.g., a suitable stainless steel) rigidly connects the upper end of the stage-1 magnetostrictive element 40 to the lower end of the stage-2 magnetostrictive element 41, it being indicated in the drawings of FIGS. 3 and 4 that connecting member 42 is radially clear of both magnetostrictive stages 40, 41 and that it is part of a welded preassembly; this presumably involves an upper circular end-closure plate 43 of ferromagnetic material, and a lower annular plate 44 (also of ferromagnetic material) which amounts to a radially outward flange, in radial lap with the lower end of the stage-2 annulus 41. A central bore 45 of limited depth within the end-closure wall 13' of upper body part 11 permits full-thickness accommodation of plate 43 within and in short radial clearance rotation to bore 45, and the axial depth of bore 45 is substantially greater than the thickness of plate 43, whether the valve is or is not actuated.

The described two-stage core will be seen to become a mechanically series-connected assembly, referenced at stage-2 upper-end abutment with the end closure wall 13', and continuously preloaded and stressed into such abutment by the action of the stiffly compliant means 32 which continuously loads the flanged poppet pin 31 against the downwardly projecting lower end of stage-1 magnetostrictive rod. Mechanical series-connection is characterized by stage-1 (magnetostrictive rod 40) preloaded abutment with upper plate 43, and by lower-flange (44) preloaded abutment with the lower end of stage-2 (magnetostrictive annulus 41). All other parts of FIGS. 3 and 4 may be as described for FIGS. 1 and 2 and are therefore given the same reference numerals, except of course for the bore 45 in end-closure wall 13' of the upper body part.

As noted above, FIG. 3 is directed to the closed, unactuated condition of the valve, wherein, as in FIG. 1, a predetermined axial clearance is provided between the lower end of poppet pin 31 and the confronting flat face of the poppet-valve member 23. As distinguished from the embodiment of FIGS. 1 and 2, FIG. 4 shows that flux induced in the two-stage core means 40, 41 is such as to establish two toroidal flux paths which are in common (at 46) except for separate parallel branching at 47, 48 along the respective first and second stages of the core. The first of these flux paths is independent at 47 along the stage-1 rod 40, and in common with stage-2 at 46, to complete the stage-1 toroidal path; the second or stage-2 toroidal path is independent at 48 along the stage-2 annulus 41, and in common with stage 1 at 46. The result of the mechanical series connection of the two stages is to enable effectively a doubling of magnetostrictive growth, evidenced as available displacement for poppet-pin pretravel plus poppet-valve-member actuated displacement.

Figure 5:
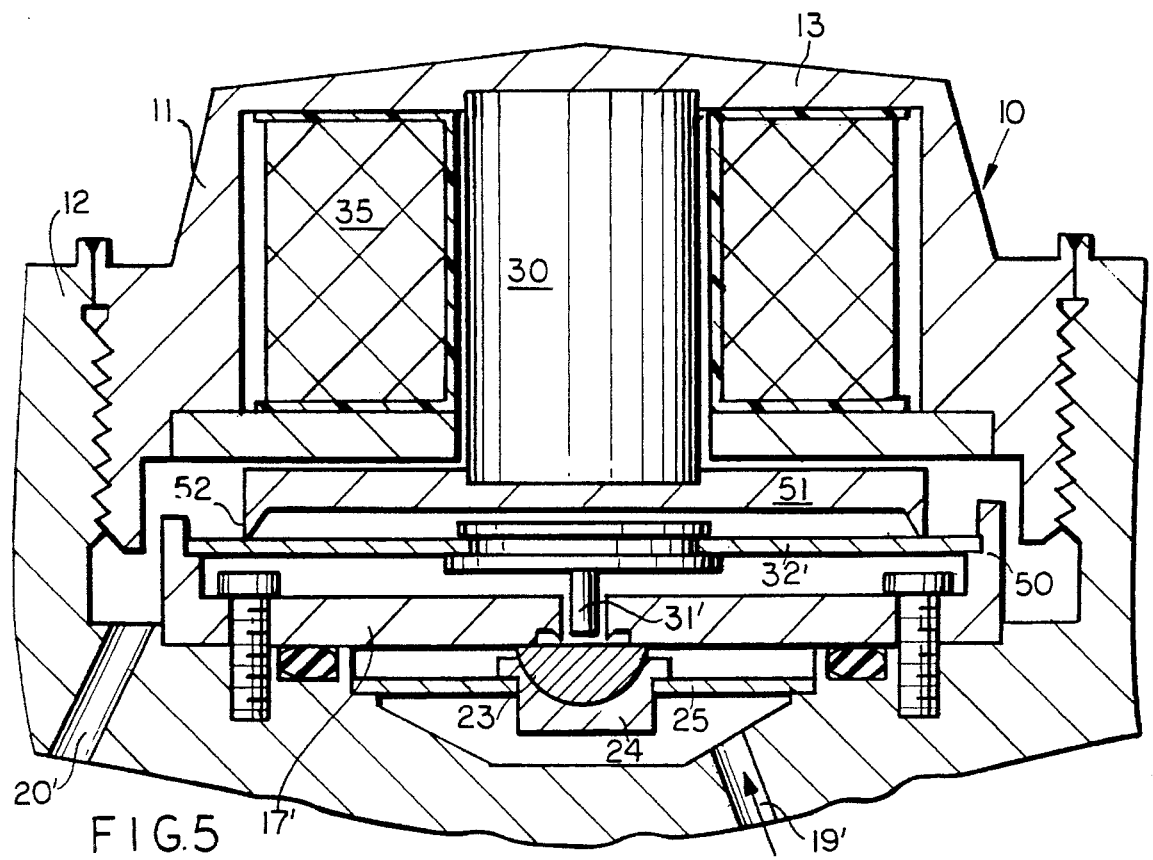
FIG. 5 is a view similar to FIGS. 1 and 3, or a third embodiment, shown for the closed position of the valve.
Figure 6:
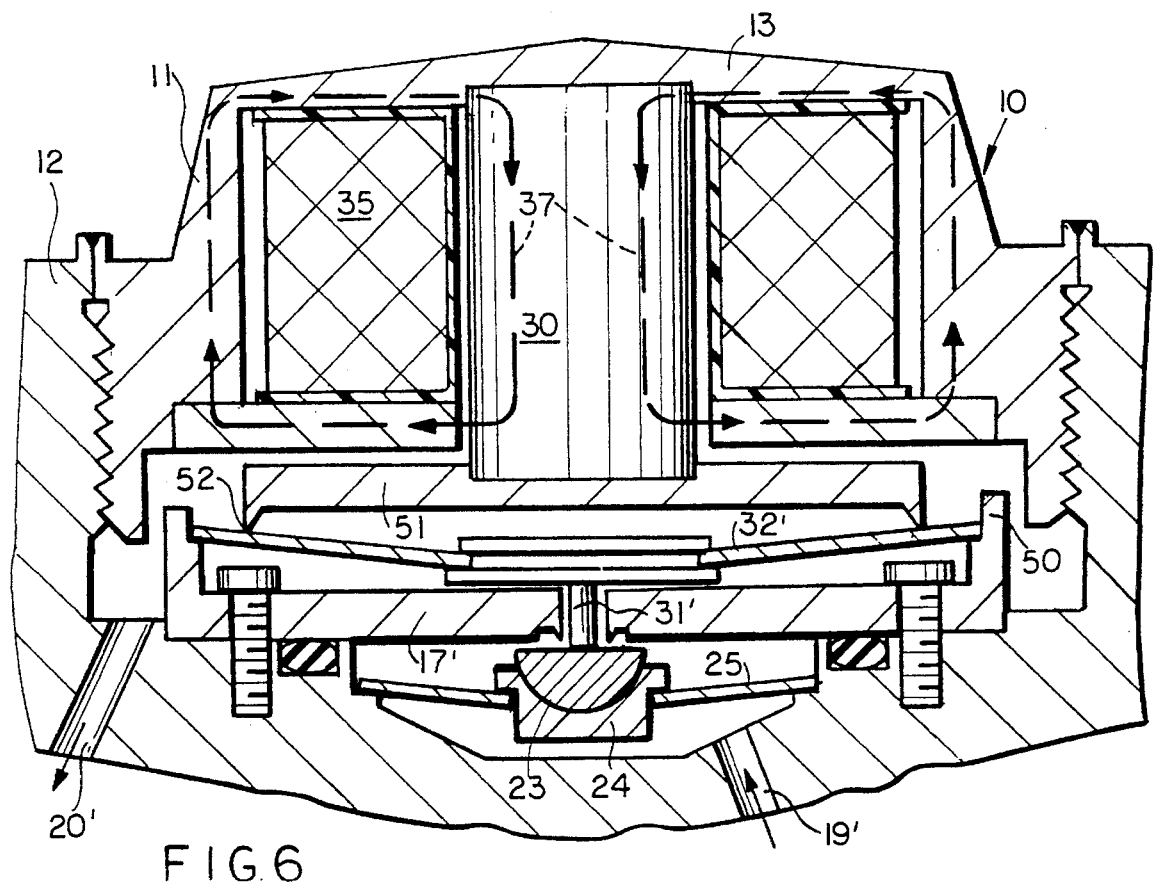
FIG. 6 is a view similar to FIG. 5, for an actuated condition of the valve, with schematic indication of electromagnetically induced excitation flux.

The embodiment of FIGS. 5 and 6 is as described for FIGS. 1 and 2, except for a mechanical-disadvantage arrangement for converting magnetostrictive-core actuating displacement into a multiplied or leveraged displacement of a flanged poppet pin 31'. The same reference numbers are adopted in FIGS. 5 and 6 (from FIGS. 1 and 2) insofar as parts are of the same descriptive properties.

The leveraged displaceability of poppet pin 31' is shown for a considerably enlarged Belleville spring 32' having an inner circular edge engaged to a shoulder or flange formation of poppet pin 31' and an outer circular edge which locates at a circumferential shoulder or flange formation 50 of a seat member 17'. A fulcrum plate 51 has a central bore of limited depth for central location with respect to the lower end of the magnetostrictive core element or rod 30, and a circular, downwardly projecting fulcrum-edge formation 52 of plate 51 engages spring 32' at a predetermined radius which is intermediate the inner-edge and outer-edge radii of spring 32'. In FIGS. 5 and 6, the radius at which plate 51 engages spring 32' is approximately at about 80 percent of the radial span between inner and outer edges of spring 32', so that a given incremental magnetostrictive elongation of core 30 will achieve about a four-times multiple of this incremental displacement, in terms of the motion imparted to the poppet-pin 31' and, after pretravel, to an opening displacement of the poppet-valve member 23. Reference to FIG. 6 reveals that the toroidal path of flux circulation remains as described for FIG. 2, namely, as identified at 37.

The described embodiments of the invention will be seen to meet all stated objects and to provide a number of features and advantages including but not limited to the following:

1. Response time constants are very short, due to properties of magnetostrictive reaction to the elongate central leg (or legs) of the toroidal ferromagnetic core paths.

2. The provision of axial clearance for poppet-pin pretravel assures temperature-independent retention of a known, truly closed, valve condition.

3. There are no mechanically sliding parts, seals or bellows, and therefore mechanical hysteresis is at a minimum, through a range of modulated controllability of valve-open conditions, via modulated excitation of a single winding 35.

4. Small incremental magnetostrictive displacements can be amplified, by series-mechanical coupling of plural magnetostrictive elements that are inductively coupled in parallel to a single excitation coil, as in FIGS. 3 and 4.

5. Alternatively, small incremental magnetostrictive displacements can be mechanically amplified by lever techniques, as in FIGS. 5 and 6.

6. Whatever the embodiment, precise establishment and retention of poppet-pin pretravel is a matter of final-assembly, thread-engaged adjustment, involving precise unthreading back-off from detected onset of valve-member leakage of pressure fluid. This can be done quickly and in the "clean room" environment of valve assembly.

7. The prestressing springs inter alia facilitate assembly and enable a core material such as Terfenol-D to be simply and easily machined and ground, square-ended, whether as a rod or as an annulus. There need be no weldments to core material.

8. For the illustrative use of Xenon as the pressure fluid, there is no corrosion problem of core exposure to the pressure fluid. On the other hand, for effluent pressure fluids of corrosive nature, non-magnetic cladding materials and techniques exist whereby core elements can be protected by cladding.

9. The described magnetostrictive actuator is characterized by high seating force, with resultant positive sealing and very low leakage under lock-up conditions, even though the poppet-to-seat configuration involves contact of hard materials.

10. In the indicated space-vehicle use of the invention, launch vibration problems are reduced to an absolute minimum, since there are no softly flexible spring elements, such as bellows, diaphragms or coil springs which are commonly used in mechanical regulators.

11. The disclosed constructions are all inherently fail-safe, into the assuredly closed valve condition.

We claim:

1. A valve comprising upper and lower valve-housing body parts which are generally cup-shaped with closed ends and with telescopically fitted mutually engaged skirt portions defining a cavity between the closed end of the upper valve-housing body part and the closed end of the lower valve-housing body part, the lower valve-housing body part having a seat member with a central opening and defining an inlet chamber on one side of said seat member and part of an outlet chamber on the other side of said seat member, a poppet-valve member supported by said lower body part in a first compliantly preloaded relation of seated closure of said central opening within said inlet chamber, a poppet pin extending with radial clearance through said central opening for actuated poppet engagement to open said valve, a magnetostrictive rod carried by said upper cup-shaped valve-housing body part on an axis of alignment with said poppet pin, and axially prestressed compliant means reacting between said seat member and said magnetostrictive rod in a second compliantly preloaded relation of rod abutment with the closed end of said upper body part, said magnetostrictive rod forming the core of a magnetic circuit wherein an excitation winding is inductively coupled to said core.

2. The valve of claim 1, in which said second preloaded relation is via said pin in engagement with said magnetostrictive rod.

3. The valve of claim 2, in which said pin is in axial clearance with said poppet for the unexcited condition of said core.

4. The valve of claim 1, in which said other valve-housing body part is of ferromagnetic material, and in which an annular plate of ferromagnetic material completes with said magnetostrictive rod a generally toroidal path of magnetic-flux conduction surrounding said winding.

5. The valve of claim 4, in which said annular plate has a central circular opening in close-radial clearance relation with said magnetostricative rod.

6. The valve of claim 1, in which the material of said magnetostrictive rod is Terfenol-D.

7. A valve comprising upper and lower valve-housing body parts which are generally cup-shaped with closed ends and with telescopically fitted mutually engaged skirt portions defining a cavity between the closed end of the upper valve-housing body part and the closed end of the lower valve-housing body part, an annular seat member having a central opening and carried by said lower body part in spaced relation to the closed end of said lower body part, said seat member defining an inlet chamber below said seat member and an outlet chamber above said seat member, a poppet-valve member within said inlet chamber and first compliant means preloaded for valve-closing relation of said poppet-valve member with respect to said central opening, a magnetostrictive rod in abutment at its upper end with the closed end of the upper body part and extending within said cavity in alignment with said central opening and in axially offset relation to said seat member, a poppet pin engaged to the lower end of said magnetostrictive rod and poised for poppet engagement via the central opening of said seat member, second compliant means prestressed for axial pre-loading reaction between said seat member and said magnetostrictive rod via said poppet pin, and means including an excitation winding coupled to said magnetostrictive rod and disposed in said upper body part for opening said valve in response to an excitation of said winding.

8. The valve of claim 7, in which, for the normally closed condition of said valve, an axial clearance exists in a pin-transmitted chain of potential displacement of said poppet in response to an excitation of said winding.

9. The valve of claim 8, in which the telescoping fit of said body skirts is via a mutually engaged threaded relation, whereby said axial clearance may be established in unthreading relative rotation of said parts after detection of valve closure.

10. The valve of claim 9, in which said body parts are secured to each other to retain said axial clearance.

11. The valve of claim 7, in which said poppet pin has a flanged base of area at least matching that of the lower end of said magnetostrictive rod.

12. The valve of claim 11, in which the flanged base of said poppet pin is axially and centrally retained by said second compliant means.

13. The valve of claim 12, in which said spring means is a relatively stiffly compliant Belleville spring washer having one or more apertures for free flow of fluid when said valve is in the open condition.

14. The valve of claim 7, in which the material of said magnetostrictive rod is Terfenol-D.

15. A valve comprising upper and lower valve-housing body parts which are generally cup-shaped with closed ends and with telescopically fitted mutually engaged skirt portions defining a cavity between the closed end of one body part and the closed end of the other body part, the lower one of said cup-shaped parts having a seat member with a central opening and defining an inlet chamber on one side of said seat member and an outlet chamber on the other side of said seat member, a poppet-valve member supported by said lower part in compliantly preloaded relation of seated closure of said central opening within said inlet chamber, a poppet pin extending with radial clearance through said central opening for actuated poppet engagement to open said valve, and a concentric two-stage magnetostrictive core for selective axial displacement of said poppet pin; a first stage of said core comprising an elongate central magnetostrictive rod engaged at its lower end to said poppet pin, a second stage of said core comprising an elongate annular magnetostrictive member coaxial with and radially spaced from said rod; a connecting annulus of non-magnetic material coaxial with said rod and in the space between said first and second stages, said connecting annulus being rigidly connected at its upper end to the upper axial end of said first stage, said connecting annulus being rigidly connected at its lower end to the lower axial end of said second stage, and the upper end of said annular magnetostrictive member having seated axial-abutting engagement with the closed end of said upper valve-body part; and an excitation winding coaxially surrounding said second-stage member and, therefore also, said first stage of said core.

16. The valve of claim 15, in which said poppet pin has a radial flange at its upper end for engagement with the lower end of said rod, and compressionally prestressed spring means reacting between said seat member and the flange of said poppet pin for upwardly preloading said annular magnetostrictive member into continuously seated engagement at its upper end to the closed end of said upper part, said preloading being via poppet-pin engagement to the lower end of said rod and via the connection of said annulus of non-magnetic material from the upper end of said rod to the lower end of said annular magnetostrictive member.

17. The valve of claim 15, in which a Belleville spring acting in prestress between said lower body part and said poppet-valve member establishes said compliantly preloaded relation of seated closure of said central opening.

18. The valve of claim 16, in which said compressionally prestressed spring means is a Belleville spring.

19. The valve of claim 16, in which, in the absence of winding excitation, said poppet pin is in axial clearance with said poppet-valve member; and in which in the circumstance of winding excitation, said poppet pin axially displaces said poppet-valve member to an open condition of communication between said chambers via said central opening.

20. The valve of claim 15, in which the material of said magnetostrictive rod and of said annular magnetostrictive member is Terfenol-D.

21. A magnetostrictively actuated valve, comprising a body defining an interior cavity having a central upstanding axis with a seat member having a central opening on said axis and dividing said cavity between an inlet chamber and an outlet chamber;

a poppet-valve member in said inlet chamber, and first compliant means axially preloading said poppet-valve member in the direction of valve-closing relation with the central opening of said seat member;

an elongate core of magnetostrictive material within said outlet chamber and concentric with said axis, said core having an upper-end portion poised for axial abutment with said body, said core defining an annular space around said core and within said body, and said core having a lower-end portion engaged to a downwardly projecting poppet pin which extends with radial clearance into said central opening;

second compliant means axially preloading the upper-end portion of said core into said abutment with said body;

and an excitation winding contained within said annular space in inductively coupled relation with said core;

said poppet pin being at axial offset from said poppet-valve member for the valve-closed condition of said valve, and said magnetostrictive core exhibiting an axial elongation in response to excitation of said winding such that said axial elongation not only closes said axial offset but also displaces said poppet-valve member to valve-open condition.

22. The valve of claim 21, in which said core is a single elongate cylinder of magnetostrictive material.

23. The valve of claim 21, in which said core is a multi-stage device wherein a first stage comprises an elongate central magnetostrictive rod engaged at its lower end to said poppet pin, a second stage of said core comprising an elongate annular magnetostrictive member coaxial with and radially spaced from said rod, an elongate connecting annulus of non-magnetic material coaxial with said rod and in the space between said first and second stages, said connecting annulus being rigidly connected at its upper end to the upper axial end of said first stage, said connecting annulus being connected at its lower end to the axially lower end of said second stage, the axially upper end of said second stage providing the upper-end portion for core abutment with said body.

24. The valve of claim 21, in which the engagement of said poppet pin to the lower-end portion of said core is a direct axially abutting engagement.

25. The valve of claim 21, in which the engagement of said poppet pin to the lower-end portion of said core is an indirect engagement, said poppet pin having a radial flange at its upper end and said second compliant means being a Belleville-spring washer having an inner circular edge engaged to said flange and an outer circular edge engaged to said seat member, and a circular fulcrum plate having a downwardly extending circular fulcrum edge of diameter intermediate the respective diameters of the inner and outer circular edges, said indirect engagement being provided by axially compressed Belleville-spring washer action on said core via contact of said fulcrum edge with said washer.

26. The valve of claim 21, in which said poppet-valve member comprises a convex spherical poppet part and a flanged socket part having a spherical concavity for self-adapting accommodation of said poppet part in said socket part, said first compliant means comprising a Belleville-spring washer having an inner circular edge engaged to the flange of said socket part and an outer circular edge engaged to said body.

27. The valve of claim 26, in which said spherical poppet part has a flat circular truncation having a flat-to-flat valve-closing relation to a flat lower surface of said seat member throughout a circumferentially continuous annular area concentric with said axis.

28. The valve of claim 23, in which said body includes an upper cup-shaped part of ferromagnetic material comprising a generally cylindrical skirt portion in axial overlap with said winding and an upper closed-end portion which provides the abutment for the upper-end portion of said core, and an annular ferromagnetic plate engaged to the lower end of said skirt portion and establishing with said core a toroidal core path via said ferromagnetic body part and said plate.

29. The valve of claim 23, in which said body includes an upper cup-shaped part of ferromagnetic material comprising a generally cylindrical skirt portion in axial overlap with said winding and an upper closed-end portion which provides the abutment for the upper-end portion of said core, a first annular ferromagnetic plate carried at the connected lower end of said second stage, and a second annular ferromagnetic plate engaged to the lower end of said skirt and establishing (1) with said first stage a first toroidal core path via said ferromagnetic body part and said first and second plates and (2) with said second stage a second toroidal core path via said ferromagnetic body part and said first and second plates.

30. The valve of claim 29, in which the upper closed-end portion of said upper cup-shaped part has a central local bore into partial axial overlap with which the upper end of said first stage extends with radial clearance and at axial offset from the closed end of said local bore for inclusion in said first toroidal core plate.

31. A magnetostrictively actuated valve, comprising a body defining an interior cavity having a central upstanding axis with a seat member having a central opening on said axis and dividing said cavity between an inlet chamber and an outlet chamber;

a poppet-valve member in said inlet chamber, and first compliant means axially preloading said poppet-valve member in the direction of valve-closing relation with the central opening of said seat member;

an elongate core of magnetostrictive material within said outlet chamber and concentric with said axis, said core having an upper-end portion poised for axial abutment with said body, said core defining an annular space around said core and within said body, a poppet pin having a radial flange at its upper end and a stem which extends with radial clearance into said opening, a Belleville spring washer having an inner circular edge in axially engaged relation to said flange and an outer circular edge in axially engaged relation to said seat member, and a circular fulcrum plate coaxially engaged to a lower-end portion of said core, said fulcrum plate having a downwardly extending circular fulcrum edge of diameter intermediate the respective diameters of the inner and outer circular edges, said Belleville-spring washer being in axially compressional loading relation with said core via contact of said fulcrum edge with said washer to thereby preload the upper-end portion of said core into said abutment with said body;

and an excitation winding contained within said annular space in inductively coupled relation with said core;

said poppet pin being at axial offset from said poppet-valve member for the valve-closed condition of said valve, and said magnetostrictive core exhibiting an axial elongation in response to excitation of said winding such that said axial elongation not only closes said axial offset but also displaces said poppet-valve member to valve-open condition.

32. The valve of claim 31, in which the material of said magnetostrictive rod is Terfenol-D.

33. A magnetostrictive actuating device, comprising cup-shaped body structure of ferromagnetic material having a skirt wall surrounding a central axis of symmetry wherein elongate two-stage core structure of magnetostrictive material is centered on said axis and defines an annular volume between said core structure and an elongate outer wall of said cup-shaped structure, electrical winding means contained within said volume and inductively coupled to both stages of said core structure, a first stage of said core structure comprising an elongate central magnetostrictive rod for providing at its lower end a magnetostrictively driven axial-displacement output from said device, a second stage of said core structure comprising an elongate annular magnetostrictive member coaxial with and radially spaced from said rod, an elongate connecting annulus of nonmagnetic material coaxial with said rod and in the space between said first and second stages, said connecting annulus being connected at its upper end to the upper axial end of said first stage, said connecting annulus being connected at its lower end to the lower end of said second stage, said body structure having a closure wall at its upper end with the axially upper end of said second stage providing upper-end core abutment with said closure wall, said closure wall having a bore within a portion of which a ferromagnetic circular element at the upper end of said first stage is axially displaceable in flux-linked radial clearance relation, a first annulus of ferromagnetic material fixed to the lower-connected end of said second stage and having a bore in flux-linked radial clearance relation with the lower end of said first stage, and a second annulus of ferromagnetic material fixed to the lower end of said skirt wall and in flux-linked radial clearance with said first annulus of ferromagnetic material.

34. The valve of claim 33, in which the material of said magnetostrictive core is Terfenol-D.

* * * * *